United States Patent [19]

Hawie

[11] 4,442,623
[45] Apr. 17, 1984

[54] CONTAINER FOR UMBRELLA RIG

[75] Inventor: Robert L. Hawie, Stratford, Conn.

[73] Assignee: The Hawie Mfg. Co., Bridgeport, Conn.

[21] Appl. No.: 421,292

[22] Filed: Sep. 22, 1982

[51] Int. Cl.³ ............................................. A01K 97/00
[52] U.S. Cl. ...................................................... 43/54.1
[58] Field of Search ................... 43/57.3, 44.84, 54.1, 43/55, 57.2, 25.2, 26

[56] References Cited

U.S. PATENT DOCUMENTS

| 1,508,204 | 9/1924 | Walker | 43/26 |
| 1,565,389 | 12/1925 | Peacock | 43/26 |
| 2,735,215 | 2/1956 | Rutledge | 43/55 |
| 3,086,312 | 4/1963 | Davis | 43/57.2 |
| 3,199,243 | 8/1965 | Caston | 43/25.2 |
| 4,203,245 | 5/1980 | Peterson | 43/25.2 |

Primary Examiner—Gene P. Crosby
Attorney, Agent, or Firm—Thomas L. Tully

[57] ABSTRACT

A compact retainer-container for an "umbrella" rig to which is attached or adapted to be attached a plurality of spaced fishing hooks or lures such as tube eels. The retainer-container comprises a narrow elongate container panel or envelope, such as of water-resistant flexible fabric material, having a narrow elongate container-retainer section, preferably having an elongate opening to receive an umbrella rig and an elongate flap or cover adapted to close said opening and said section. The retainer-container section comprises opposed retainer structure at each end thereof, each adapted to receive two adjacent flexible arms of an "umbrella" rig which are flexed together and to restrain said arms against flexing apart while the umbrella rig is contained within said section.

19 Claims, 6 Drawing Figures

CONTAINER FOR UMBRELLA RIG

BACKGROUND OF THE INVENTION

"Umbrella" rigs are commonly-used conventional fishing accessories which are designed to accommodate a plurality of fish hooks, lures, jigs, tube eels or similar fish hook devices suspended in spaced relation outwardly and downwardly from a single central fish line. Such rigs comprise a central support to which the fish line is attached, and generally two rigid but flexible diagonal wires which extend through and are attached to the support on slightly different planes and at right angles relative to each other to provide four wire arms having spaced termini, each which is adapted to have a fish hook device attached thereto and suspended therefrom to provide four spaced fish hook devices suspended from a single fish line attached to the central support. The support may also have a fish hook device suspended directly therefrom to provide a fifth such device, equispaced between the other four devices.

Such "umbrella" rings generally are marketed in three standard sizes, as measured by the length of the two diagonal wires, the centers of which are attached to the central support. Such sizes are fifteen inches, twenty inches (most common) and twenty-five inches. While such rigs function well for their intended purpose, they present serious storage and handling problems due to their dimensions and due to the plurality of fish hook devices suspended therefrom. Also, such rigs, per se, are generally sold either unpacked or in original shrink packs or blister packs which support the rigs with the wires extended in normal use position, thereby requiring packs which are at least as long and wide as the size of the rig, i.e., twenty inches by twenty inches in the case of twenty-inch rigs. However, the rigs are also sold in flexed condition in long plastic bags.

Umbrella rigs containing the fish hook devices present important problems of storage and handling. The amount of storage space on a boat or in a fishing tackle box is quite limited and, therefore, umbrella rigs are difficult to store during periods of non-use. Also, one or more fish hook devices are generally suspended from each of the arms by a line so as to have a length of up to one or two feet or more down from each arm of the umbrella rig. The plurality of such devices coupled with the dangerous hooks thereon and the spread dimensins of the umbrella rig make it difficult to handle and store such loaded rigs without entanglement, injury and/or catching of the hooks in the clothing or boat parts.

Commonly, users will remove the spaced fish hook devices from the umbrella righ, i.e., unload the rig, to facilitate handling and storage. This is time-consuming and also disarms the rig so that it cannot be reused without reloading.

SUMMARY OF THE INVENTION

The present invention relates to a novel retainer-container for packaging and storing umbrella rigs, per se, or with attached fish hook devices, so that the rig is more compact and requires substantially less storage space, and so that the rig can be handled, contained and released more easily, more safely and more quickly than is now possible.

Figure 4:
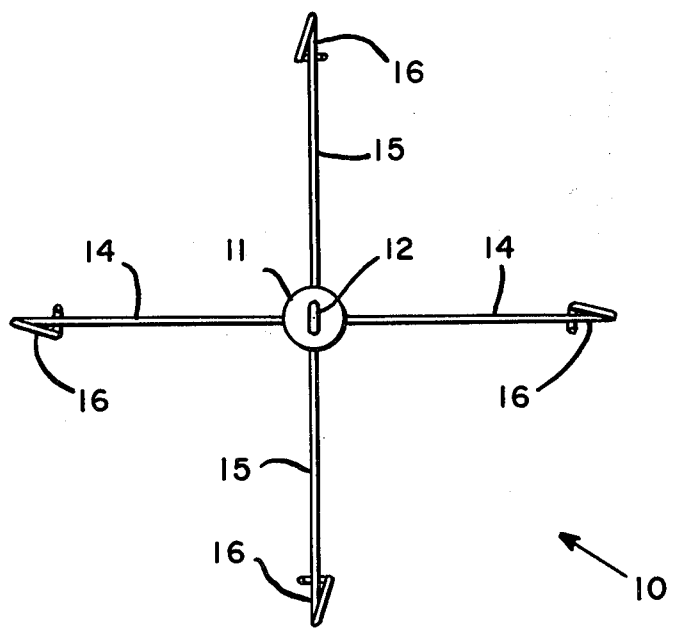
FIG. 4 is a bottom view of a conventional umbrella rig in relaxed, use condition.
Figure 5:
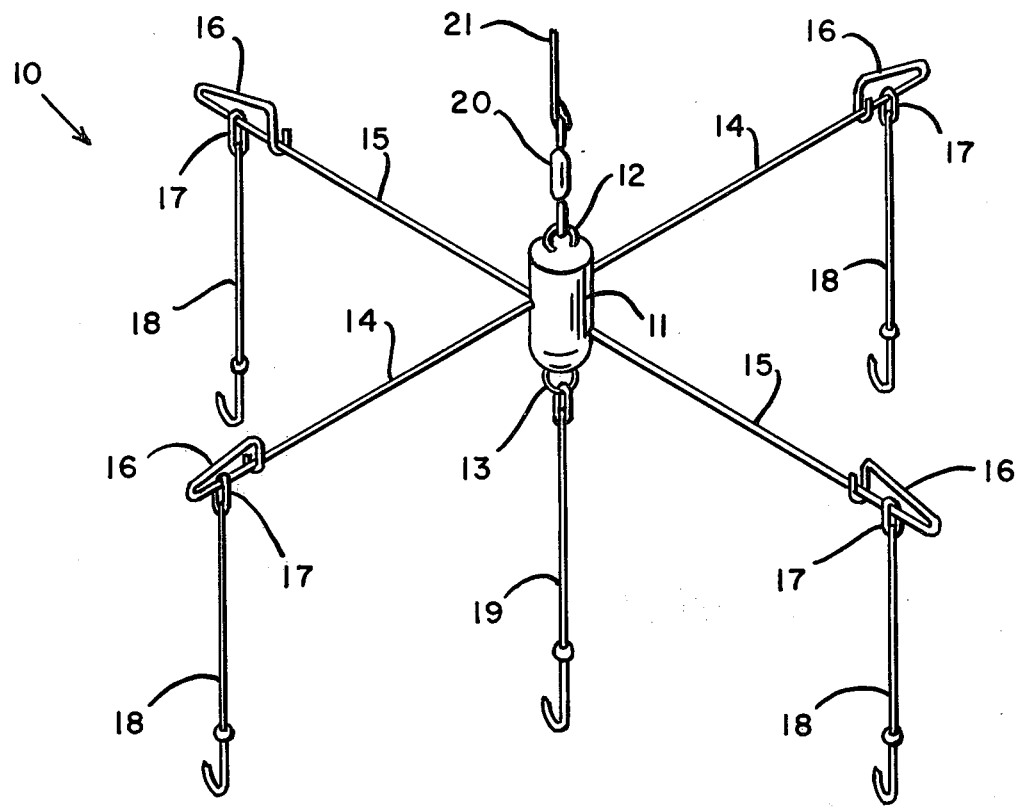
FIG. 5 is a perspective view of a conventional umbrella rig in relaxed, use condition, attached to a fishing line and having suspended therefrom five attached fish hook devices.

Referring to the drawing, a conventional umbrella rig 10 is shown in FIGS. 4 and 5. The rig 10 comprises a central support 11, generally a molded lead weight, having an upper line attachment eyelet 12 and a lower hook device attachment eyelet 13 which is usually integral with eyelet 12, through the support 11. The support 11 carries two relatively rigid but flexible wires 14 and 15 which extend through the support 11 in a direction transverse to the axis of the support 11 and at right angles to each other on spaced planes so that the midpoint of each wire, 14 and 15, is embedded within and fixed to the support 11. This provides four radial wire arms, the ends of any adjacent pair of which can be flexed together from their points of entry or attachment to the central support 11. The ends of each of the wires 14 and 15 are generally provided with operable eyelets or clips 16 which can be opened to permit the end loop 17 of a fish hook device 18 to be introduced and then closed or refastened to attach the device 18 to the clip 16 and prevent the loop 17 from sliding along the wire, 14 or 15. A fifth fish hook device 19 can be tied or clipped to the lower eyelet 13 of the support 11, as shown in FIG. 5 which illustrates a loaded umbrella rig. The upper eyelet 13 may be attached to a swivel device 20 to which the fishing line 21 is fastened, preferably by means of a release clip.

The present invention relates to the retainer-container for the umbrella rig, not to the rig, which is illustrated in FIGS. 4 and 5 for purpose of clarifying the present description relative to the retainer-container.

Figure 1:
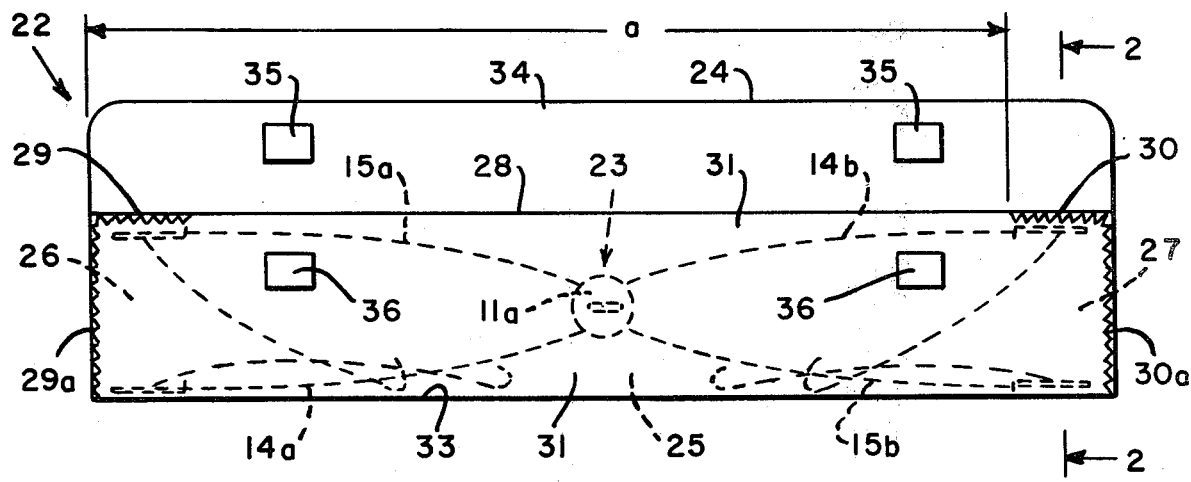
FIG. 1 is a plan view of an umbrella rig retainer-container according to one embodiment of the present invention, a loaded umbrella rig being illustrated as retained and contained therein and the cover flap being illustrated in open position.
Figure 2:
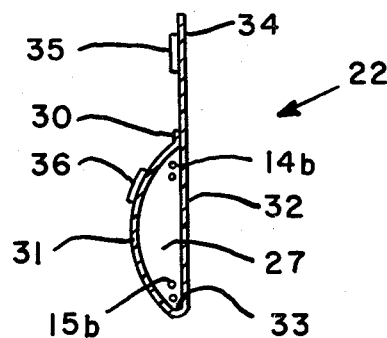
FIG. 2 is a sectional view taken along the line 2—2 of FIG. 1.
Figure 3:
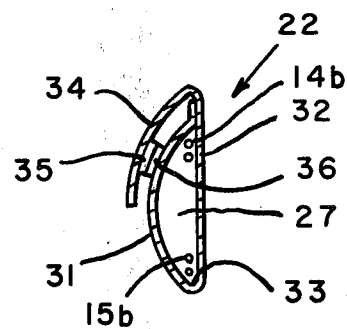
FIG. 3 is a view corresponding to that of FIG. 2 but illustrating the cover flap in folded, fastened position.

Referring to FIGS. 1 to 3, one embodiment of a retainer-container 22 is illustrated as having a loaded umbrella rig 23 retained and contained therein in flexed condition.

The retainer-container 22 comprises an elongated envelope 24 having a container section 25 including opposed retainer compartments or pockets 26 and 27, an elongate opening 28 which is centered relative to the length of container section 25 and extends slightly less than the entire length of compartment 25 so as to leave opposed end closure seals 29 and 30 comprising areas at which the front panel 31 is attached to the rear panel 32, said panels 31 and 32 defining therebetween the container section 25, and each of said seals 29 and 30 defining between itself and the bottom 33 of the section 25 transverse retainer means for holding the flexed pairs of arms against separation. The front panel 31 and rear panel 32 are also attached to each other by side seals 29a and 30a to provide closed seats in the retainer pockets 26 and 27 and prevent sliding escape of a confined ring. Thus, the pockets 26 and 27 are closed on three sides and open to the container section 25 of which they form a portion.

In the embodiment illustrated in FIGS. 1 to 3, the rear panel 32 is wider than the front panel 31 and extends upwardly beyond the opening 28 to provide an elongated flap or cover 34 which extends along at least the length of the opening 28 and which is adapted to be folded down over the front panel 31 to cover the opening 28. Preferably spaced fastening means such as cooperative Velcro fastener patches 35 and 36 (known as statistical loop fasteners) are provided on the inside surface of the flap 34 and on the outer surface of the front panel 31 in order to secure the flap 34 in closed position, as shown by FIG. 3.

As shown by FIGS. 1 to 3, an umbrella rig 23, such as the rigs of FIGS. 4 or 5, can be flexed and inserted into the container section 25 so that it is compact and is restrained against springing out when the cover flap 34 is opened. The user is able to reach into opening 28, avoiding the hooks on the hook devices, grasp the ends of the wire arms 14a and 15a which are flexed together in one of the retainer pockets, such as 26, and flex the rig so that the center section comprising rig support 11a bows out of the opening 28 to permit the grasped ends of wire arms 14a and 15a to be withdrawn from the pocket, such as 26, while the opposed ends of wire arms 14b and 15b remain restrained within the opposed opening pocket 27. When the grasped ends of wire arms 14a and 15a have been safely withdrawn from pocket 26, the grasp on wire arms 14a and 15a may be relaxed slowly to permit the wire arms 14a and 15a to spring back into the position in which they extend at a right angle relative to each other. Then the fish hook devices, attached to the withdrawn and relaxed arms 14a and 15a, can be lifted carefully out of the container section 25 or the container can be inverted to permit such hook devices to slip out of the section 25 without contact with the fingers.

Finally, the other wire arms 14b and 15b, which remain confined and restrained within pocket 27 can be grasped between the fingers, squeezed together and slipped out from beneath the closure seal 30 and out of pocket 27. This enables the rig to be lifted away from container section 25 so that the hook devices attached to arms 14b and 15b can be lifted from the container section 25 without contact with the hands.

The loaded umbrella rig can be reinserted into the retainer-container 22 in safe and simple manner by reversing the procedure discussed above. Once inserted and restrained, the compact umbrella rig cannot become released unless it is manually flexed and withdrawn.

A critical requirement of the novel retainer-container embodied by FIGS. 1 to 3 is the necessity that the length of opening 28 is sufficiently less than the length of the umbrella rig to be retained therein to enable each pair of flexed wire arms, 14a and 15a and 14b and 15b, to be restrained in compact, flexed condition within at least a portion of the pockets 26 and 27. When the ends of pair 14a, 15a are locked in pocket 26, the length of opening 28 must be such that the ends of pair 14b, 15b extend sufficiently into the opposed pocket 27 to be restrained in compact, flexed condition within at least a portion of pocket 27.

Preferably the length of the container section 25, from the base of each of the pockets 26 and 27 to the opposite end of the opening 28, shown as length "a" in FIG. 1 relative to pocket 27, is at least slightly less than the length of the compact, flexed umbrella rig so that neither end of the flexed wires can escape confinement until the rig is manually flexed for removal in the manner discussed hereinbefore.

FIGS. 1 to 3 illustrate a preferred embodiment of retainer-container comprising a flexible water-resistant fabric container, such as one formed from canvas, synthetic woven fabrics such as nylon or polyester, extruded synthetic fabrics or films such as polyethylene terephthalate, synthetic rubber, etc. The pockets 26 and 27 can be formed by sewing the panels together at areas 29, 29a, 30 and 30a. If the container is formed from synthetic thermoplastic fabric, the areas 29, 29a, 30 and 30a can be formed by fusing the panels together in said areas by means of heat or sonic fusion.

While Velcro fasteners 35, 36 are very suitable for use as fastening means because of their simplicity and weather-resistance, other fastening means may be used such as plastic snap-fasteners, a plastic zipper or even a wrap-around tie string.

Figure 6:
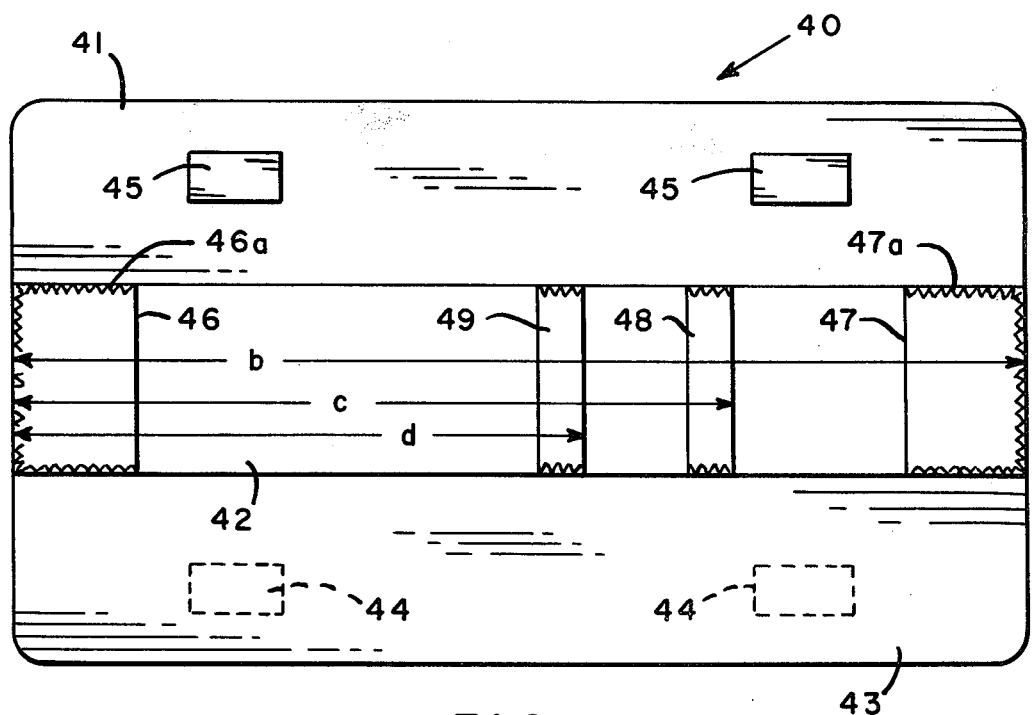
FIG. 6 is a plan view of an umbrella rig retainer-container according to another embodiment of the present invention, said retainer-container being adapted to retain and contain an umbrella rig of any standard size.

The retainer-container 40 of FIG. 6 is one adapted to contain and retain an umbrella rig of any standard size. Container 40 has a top panel or flap 41, a central container panel 42 and a bottom panel or flap 43, the bottom flap 43 being foldable over the container section 42 to expose the fasteners 44 and the top flap 41 being foldable over the folded bottom flap 43 to permit engagement between the fasteners 45 and the fasteners 44, i.e., companion Velcro elements, to cover and secure the container section 42.

The container section 42 has a length "b" which extends from the base of end pocket 46 to the base of end pocket 47 and which is slightly greater than the length of a compact flexed umbrella rig of the largest size, i.e., about twenty-five inches. End pockets 46 and 47 are formed by sewing, adhering or heat-welding fabric cover pieces 46a and 47a, respectively, to the container section to form the pockets 46 and 47 wich have their openings facing each other.

Thus, when the container-retainer 40 is in open position, as shown, a large umbrella rig can be flexed to insert one adjacent pair of arms within pocket 46 and the other adjacent pair of arms within pocket 47. The fish hook devices, if present, can be laid over the container section and the bottom flap 43 and the top flap 41 can be folded thereover, in sequence, to bring the fasteners 44 and 45 into engagement to secure the container-retainer.

If the umbrella rig to be retained is of small standard size (15 inches) or medium standard size (20 inches), the opposed end pockets 46 and 47 are spaced too great a distance to retain and contain both pairs of flexed arms of such umbrella rigs. Therefore, supplemental or alternative pockets or transverse loops 48 and 49 are provided. Loops 48 and 49 are fabric cover pieces which are sewn, adhered or heat-welded to the container section 42 at their opposed ends at specific locations relative to the base of pocket 46 so that distances or lengths "c" and "d" are slightly less than the lengths of flexed umbrella rigs of medium and small standard sizes respectively, i.e., "c" equals about 19 inches and "d" equals about 14 inches. If desired, loops 48 and 49 may be replaced with intermediate pockets which are closed on three sides and which are open to the fourth side facing end pocket 46, similar to end pocket 47, so as to retain the contained small and intermediate size umbrella rigs against sliding motion.

If desired, the present retainer-containers may be rigid containers such as ones molded from plastic and in which the front and rear panels are indirectly united by means of narrow bottom and side panels. However, such rigid containers are less preferred because they are more bulky and the pocket openings are not flexible for ease of insertion and removal of the umbrella rig.

Variations and modifications of the present invention will be apparent to those skilled in the art within the scope of the present claims.

I claim:

1. A retainer-container for an umbrella rig having a central support and four flexible wire arms extending radially therefrom at angles of 90° relative to each other, adjacent pairs of said arms being capable of being flexed together so that the extremities thereof are parallel to each other, said retainer-container comprising a narrow, elongate container section which is sufficiently long to receive an umbrella rig in flexed condition and which comprises an elongate fabric panel having opposed transverse spaced retainer means attached to said fabric panel, each of said transverse retainer means having an entrance which is open to the center of said container section, whereby a pair of adjacent wire arms of an umbrella rig can be flexed together and inserted into said container section and into the entrance of one of said retainer means for confinement therein in flexed condition and the other pair of adjacent wire arms can be flexed together and inserted into said container section and into the entrance of the other said retainer means for confinement therein in flexed condition to contain and retain said umbrella rig in said narrow elongate container section.

2. A retainer-container according to claim 1 in which said transverse retainer means comprise narrow flexible fabric panels which are directly united to said elongate fabric panel.

3. A retainer-container according to claim 2 in which said flexible fabric is water resistant.

4. A retainer-container according to claim 1 which comprises an elongate top panel which is attached to said elongate fabric panel to provide a top flap which is foldable over said container section to cover said retainer-container.

5. A retainer-container according to claim 1 which comprises elongate top and bottom panels which are attached to said elongate fabric panel to provide top and bottom flaps which are foldable over said container section to cover said retainer-container.

6. A retainer-container according to claim 4 or 5 which contains means for fastening said retainer-container when said top flap is folded.

7. A retainer-container according to claim 6 in which said fastening means comprises a statistical loop fastener.

8. A retainer-container according to claim 1 which also contains at least one intermediate transverse retainer means which is spaced from one of said end retainer means by a distance sufficient to accommodate a flexed umbrella rig of reduced length.

9. A retainer-container according to claim 1 in which said container section formed between a front panel and said elongate fabric panel which are united along an elongate bottom and the narrow sides thereof and also along the top of said container section inwardly from each of said narrow sides a minor distance relative to the length of said front and elongate panels to form said retainer means comprising pockets at each end of said container section and to leave an elongate central opening at the top of said container section, said opening being less in length than the length of the umbrella rig in flexed condition, whereby an umbrella rig can be flexed and inserted into said opening.

10. A retainer-container according to claim 1 which retains and contains a flexed umbrella rig.

11. A retainer-container according to claim 10 in which said umbrella rig is loaded with fish hook devices.

12. A flexible fabric retainer-container for an umbrella rig having a central support and four flexible wire arms extending radially therefrom at angles of 90° relative to each other, adjacent pairs of said arms being capable of being flexed together so that the extremities thereof are parallel to each other, said retainer-container comprising a narrow, elongate container section comprising a fabric container panel, top and bottom fabric panels which are united to said container panel to enclose said container section, opposed retainer panels attached to said container panel inwardly from each end thereof a minor distance relative to the length of said container panel to form retainer pockets at each end of said container section, said pockets having openings which face each other, said openings being spaced from each other by a distance less than the length of the umbrella rig in flexed condition, whereby a pair of adjacent wire arms of an umbrella rig can be flexed together and inserted into one of said pockets for confinement therein in flexed condition and the other pair of adjacent wire arms can be fixed together and inserted into the other side pocket for confinement therein in flexed condition to contain and retain said umbrella rig in said narrow elongate container section.

13. A retainer-container according to claim 1 in which a front fabric panel is directly united to said elongate fabric panel at the bottom, sides and top ends to form said retainer means and a flexible container section having a central elongate opening at the top thereof.

14. A retainer-container according to claim 12 in which said top panel extends beyond said container section to provide a flap which is foldable over said container section.

15. A retainer-container according to claim 14 which contains means for fastening said retainer-container when said flap is folded.

16. A retainer-container according to claim 15 in which said fastening means comprises a statistical loop fastener.

17. A retainer-container according to claim 13 in which the length of said container section from each end thereof to the far end of said central elongate opening is less than the length of the flexed umbrella rig.

18. A retainer-container according to claim 12 which retains and contains a flexed umbrella rig.

19. A retainer-container according to claim 18 in which said umbrella rig is loaded with fish hook devices.

* * * * *